United States Patent Office 3,471,586
Patented Oct. 7, 1969

3,471,586
PREPARATION OF ACTIVE HYDROCARBON CONVERSION CATALYSTS
George R. Lester, Park Ridge, Ill., assignor to Universal Oil Products Company, Des Plaines, Ill., a corporation of Delaware
No Drawing. Filed Aug. 27, 1965, Ser. No. 483,306
Int. Cl. C07 3/62; B01j 11/04
U.S. Cl. 260—683
2 Claims

ABSTRACT OF THE DISCLOSURE

Active hydrocarbon conversion catalysts are prepared by treating a metal-containing catalyst are prepared by treating a metal-containing catalyst with an oxidizing agent at an elevated temperature and pressure to convert said metal to a higher valence state, thereafter cooling said catalyst in the presence of said oxidizing agent and utilizing the catalyst without reducing said catalyst.

---

This invention relates to a process for the preparation of hydrocarbon conversion catalysts. More specifically, the invention is concerned with a process for the activation of metal-containing catalysts.

Hydrocarbon conversion catalysts comprising metallic oxides per se, or composited on solid supports, are as a general rule more active when the metals or compounds thereof such as oxides are present in a higher valence state as compared to catalysts comprising metals or metal oxides in a lower valence state. Catalysts which contain these metal oxides in the higher valence state may be formed by treatment with an activating agent usually comprising an oxidation agent such as air, oxygen or any other source containing oxygen. This treatment of the metal oxides is usually effected at elevated temperatures pressures, the equilibrium between the higher and lower valence states being dependent upon temperature for shifting said equilibrium to the higher valence state. The mobility of the ions in the solid at an elevated temperature permits what might be termed a rapid relaxation of the solid back to the lower valence state when contact with the oxidation agent is discontinued. Heretofore, the usual procedure for maintaining a higher valence state has been to cool the solid rapidly in an inert flash gas to the temperature at which the hydrocarbon conversion reaction is to be effected, thereby hoping to "freeze" the high temperature equilibrium in the direction of the high valence state. Another prior art method for attempting to maintain a more active catalyst is to react the solid catalyst with hydrogen at the high temperature at which te activation is effected thus attempting to form an "activated" lower oxide before cooling.

It is therefore an object of this invention to provide a process whereby highly active hydrocarbon conversion catalysts are prepared which will maintain their high degree of activity during the conversion process.

A further object of this invention is to provide a process for activating metal-containing catalysts whereby the metal portion of the catalyst will be present and will be maintained in a high valence state thereby increasing the activity of said catalyst for a longer period of time.

In one aspect, an embodiment of this invention resides in a process for the preparation of an activated hydrocarbon conversion catalyst which comprises treating a metal-containing catalyst with an activating agent at an elevated temperature and pressure, thereafter cooling said metal-containing catalyst in the presence of said activating agent, and recovering the activated catalyst.

A further embodiment of this invention is found in a process for the preparation of an activated hydrocarbon conversion catalyst which comprises treating a metal-containing catalyst with air at an elevated temperature and pressure, thereafter cooling said metal-containing catalyst in the presence of said air, and recovering the activated catalyst.

Yet another embodiment of this invention is found in a process for the preparation of an activated hydrocarbon conversion catalyst which comprises treating a metal-containing catalyst with an oxidizing agent at a temperature in the range of from about 500° to about 600° C. and at a pressure in the range of from about 50 to about 2,000 pounds per square inch, thereafter cooling said metal-containing catalyst in the presence of said oxidizing agent at a pressure in the range of from atmospheric to about 2,000 pounds per square inch, and recovering the activated catalyst.

A specific embodiment of this invention resides in a process for the preparation of an activated hydrocarbon conversion catalyst which comprises treating a molybdenum-containing catalyst with an oxidizing agent at a temperature in the range of from about 500° to about 600° C. and at a pressure in the range of from about 50 to about 2,000 pounds per square inch, thereafter cooling said molybdenum-containing catalyst in the presence of said oxidizing agent at a pressure in the range of from about atmospheric to about 2,000 pounds per square inch, and recovering the activated catalyst.

Other objects and embodiments will be found in the following further detailed description of this invention.

As hereinbefore set forth, the present invention relates to a process for the preparation of activated hydrocarbon conversion catalysts. The catalysts which are prepared according to the process of this invention may be used in such conversion processes as polymerization of olefinic hydrocarbons as well as olefin disproportionation. The later process will be particularly useful in obtaining desired products from refinery off-gases wherein compounds other than those originally present are desired. For example propylene may be disproportionated to form ethylene and butene; butene may be disproportionated to form propylene and pentene. When a specific hydrocarbon is subjected to disproportionation, especially those containing more than 4 carbon atoms in length, it has been found that the olefin produced which contains a lower number of carbon atoms will contain $\alpha$-unsaturation while the olefin produced which contains a higher number of carbon atoms than the original olefin will contain $\beta$-unsaturation. This process will then be useful for obtaining compounds in which a specific type of unsaturation is desired or required.

Metals or metal oxides which may be treated in a manner hereinafter set forth in greater detail will include those which are selected from the group consisting of Groups I–B, V–B, VI–B, VII–B, and VII of the Periodic Table. Such metals include copper, gold, silver, vanadium, niobium, tantalum, chromium, tungsten, molybdenum, manganese, technetium, rhenium, iron, cobalt, nickel, ruthenium, rhodium, palladium, osmium, iridium and platinum.

The aforementioned metals or oxides thereof may be composited, if so desired, on solid supports. Specific examples of these solid supports comprise metal oxides such as the various forms of alumina including $\alpha$-alumina, $\gamma$-alumina, $\eta$-alumina, $\theta$-alumina, etc., silica or mixtures of metal oxides such as silica-alumina, silica-zirconia, silica-magnesia, silica-alumina-magnesia.

The process of the present invention in which activated hydrocarbon conversion catalysts are prepared may be effected in any suitable manner, usually at elevated temperatures ranging from about 500° up to about 600° C. or more and at pressures ranging from atmospheric up to about 2,000 pounds per square inch. Activating agents which may be used to treat the catalytic composition of matter will include oxygen or oxygen-containing gases such as air. A specific example of a method of activating a catalytic composition of matter to a higher valence state would be treating a catalyst comprising a metal oxide composited on a solid support with oxygen or an oxygen-containing gas at a temperature in the range hereinafter set forth for a predetermined period of time which may range from about 1 up to about 10 hours or more. At the end of this time, the heating step is discontinued and the catalyst allowed to cool to the operating temperature of the reaction for which it is to be used. During the cooling period, the activating agent is continuously passed over the catalyst at either atmospheric pressure or an elevated pressure ranging from about 50 to about 2,000 pounds per square inch. An elevated pressure is usually only required for those higher oxides of the metals which are relatively unstable in nature, the cooling step with relatively stable higher oxides being effected at atmospheric pressure in the atmosphere of the activating agent.

The following examples are given to illustrate the process of the present invention which, however, are not intended to limit the generally broad scope of the present invention in strict accordance therewith.

catalyst in the presence of the activating agent which, as herein set forth comprises an oxygenating agent, is illustrated herein. A catalyst comprising cobalt-molybdenum composited on $\gamma$-alumina was activated by placing said catalyst in a reaction apparatus, heating the apparatus to a temperature of 550° C. and purging the catalyst for 5 hours with air at a rate of 2.0 cubic feet per hour. At the end of this time, the temperature of the catalyst and apparatus was allowed to cool from 550° C. to 175° C. during a period of 10 hours, while maintaining a continuous air purge of the reactor at a rate of 2.0 cubic feet per hour. The apparatus was pressure tested at a temperature of 175° C. and a pressure of 450 pounds per square inch using air. The unit was then depressured and purged with sodium-dried nitrogen for a period of 0.5 hours at a rate of 0.3 cubic feet per hour. A feed comprising 40 weight percent of propane and 60 weight percent of propylene are cut in at this point. The propylene was disproportionated under conditions similar to that set forth in Example I above; namely, a block temperature of 175° C., a pressure of 450 pounds per square inch and a weight hourly space velocity of 10.

The results of this disproportionation reaction are set forth in Table II below, said results being obtained by a gas chromatographic analysis given in mole percent.

TABLE II

| | Charge stock | 0-15 min. | Conv. $C_3^-$ | 15M-1 hour | Conv. $C_3^-$ | 1-4½ hours | Conv. $C_3^-$ | 4½-5 hours | Conv. $C_3^-$ |
|---|---|---|---|---|---|---|---|---|---|
| $C_2$ | | 0.2 | | 0.1 | | 0.1 | | 0.1 | |
| $C_2^-$ | | 12.0 | 12.0 | 12.5 | 12.5 | 12.1 | 12.1 | 11.5 | 11.5 |
| $C_3$ | 40.6 | 40.0 | | 40.1 | | 40.8 | | 40.0 | |
| $C_3^-$ | 59.6 | 35.6 | | 34.9 | | 36.0 | | 37.0 | |
| i-$C_4$ | | 0.2 | 0.2 | 0.2 | 0.2 | 0.2 | 0.2 | | |
| n-$C_4$ | | | | | | | | 0.8 | 0.8 |
| $C_4^-$ | | 0.8 | | 0.8 | | 0.7 | | 0.5 | |
| i-$C_4^-$ | | | | | | | | | |
| Trans $C_4^-$-2 | | 6.4 | 9.1 | 6.6 | 11.3 | 6.4 | 10.8 | 6.2 | 10.4 |
| Cis $C_4^-$-2 | | 1.9 | | 3.9 | | 3.7 | | 3.7 | |
| $C_6^+$ | 0.2 | 2.9 | 2.7 | 0.9 | 0.7 | | | 0.2 | |

EXAMPLE I

To illustrate the advantages of cooling the activated catalyst in the presence of the activating agent, an experiment was performed in which the cobalt and molybdenum were composited on $\gamma$-alummina and placed in a reaction tube. The catalyst was activated by heating the tube to 550° C. and purging the catalyst with 2.0 cubic feet per hour of air for a period of 5 hours. At the end of this time, the catalyst was purged with nitrogen at a rate of 5.0 cubic feet per hour while the catalyst was cooled from a temperature of 550° C. to a temperature of 175° C. during a period of 9.5 hours. Following this, the plant was pressure tested at 175° C. and 450 pounds per square inch of nitrogen for a period of 1 hour. A feed comprising 40 weight percent of propane and 60 weight percent of propylene was charged to the plant at a rate of 100 g. per hour. The propylene disproportionation reaction was effected at 450 pounds per square inch pressure, 175° C. temperature and a weight hourly space velocity of 10. The results are set forth in Table I below, said results being obtained by a gas-liquid chromatograph analysis.

TABLE I

| | Charge stock | 0-15 min. | 5 hours | 10 hours |
|---|---|---|---|---|
| $C_2$ | | 0.24 | | |
| $C_2^-$ | | 0.24 | 0.1 | 0.2 |
| $C_3$ | 40.1 | 42.3 | 39.7 | 39.2 |
| $C_3^-$ | 59.6 | 54.3 | 58.5 | 57.7 |
| t-$C_4^-$-2 | | 0.12 | | |
| c-$C_4^-$-2 | | | | |
| 1-$C_4^-$+i-$C_4$ | | | | |
| n-$C_5$ | | 0.6 | | |
| $C_6^+$ | 0.2 | 2.2 | 1.7 | 2.9 |

As is readily apparent from the above table, it is noted that a relatively insignificant amount of disproportionation of propylene was effected over a period of 10 hours.

EXAMPLE II

In this example, the necessity for cooling an activated

As is noted from the above table the catalyst thus prepared was effective for a period of at least 5 hours, after which time the run was discontinued. During the first period, the propylene conversion to tehylene and a mixture of butenes was 40.3%, during the second period the conversion amounted to 41.4%, while the third and fourth period above illustrated show a conversion of 38.4%. This is in contradistinction to the results shown in Table I above in which the propylene conversion amounted to 8.9%, 1.8% and 3.2% respectively for the three periods. Therefore, it is relatively apparent that a catalyst which has been activated according to the process hereinbefore set forth will have a much higher conversion activity, especially in disproportionation reactions and will maintain the aforementioned high activity for a relatively longer period of time when compared to catalysts which have been activated at a high temperature with an activating agent and thereafter cooled to operating conditions in the absence of the activating agent.

I claim as my invention:

1. A process for the disproportionation of olefinic hydrocarbons which comprises treating an olefinic hydocarbon in the presence of a catalyst which has been activated by treating a catalyst comprising cobalt and molybdenum composited on alumina with an oxidizing agent at a temperature in the range of from about 500° C. to about 600° C. and at a pressure in the range of from about 50 to about 2,00 pounds per square inch to convert said cobalt and molybdenum to a higher valence state, thereafter cooling said catalyst comprising cobalt and molybdenum composited on alumina in the presence of said oxidizing agent at a pressure in the range of from about atmospheric to about 2000 pounds per square inch, and utilizing said catalyst while said cobalt and molybdenum remain in said higher valence state.

2. A process for the disproportionation of propylene which comprises treating said propylene at disproportionation conditions in the presence of a catalyst comprising cobalt and molybdenum composited on alumina, said catalyst having been prepared by treating said catalyst with air at a temperature in the range of from about 500° C. to about 600° C. and at a pressure in the range of from about 50 to about 2,000 pounds per square inch to convert said cobalt and molybdenumm to a higher valence state, thereafter cooling said catalyst in the presence of said air at a pressure in the range of from about atmospheric to about 2,000 pounds per square inch, utilizing said catalyst while said cobalt and said molybdenum remain in said higher valence state, and recovering the resultant ethylene and butenes.

References Cited

UNITED STATES PATENTS

| | | | |
|---|---|---|---|
| 2,856,350 | 10/1958 | Love | 208—140 |
| 2,879,232 | 3/1959 | Malo et al. | 252—416 |
| 2,987,487 | 6/1961 | Stevens et al. | 252—467 |
| 3,261,879 | 7/1966 | Banks | 260—683 |

DELBERT E. GANTZ, Primary Examiner

C. E. SPRESSER, Assistant Examiner

U.S. Cl. X.R.

252—454, 463, 465, 472